Sept. 5, 1939.     F. H. PIERSON     2,172,174
CABLE HANGER
Filed Dec. 16, 1938
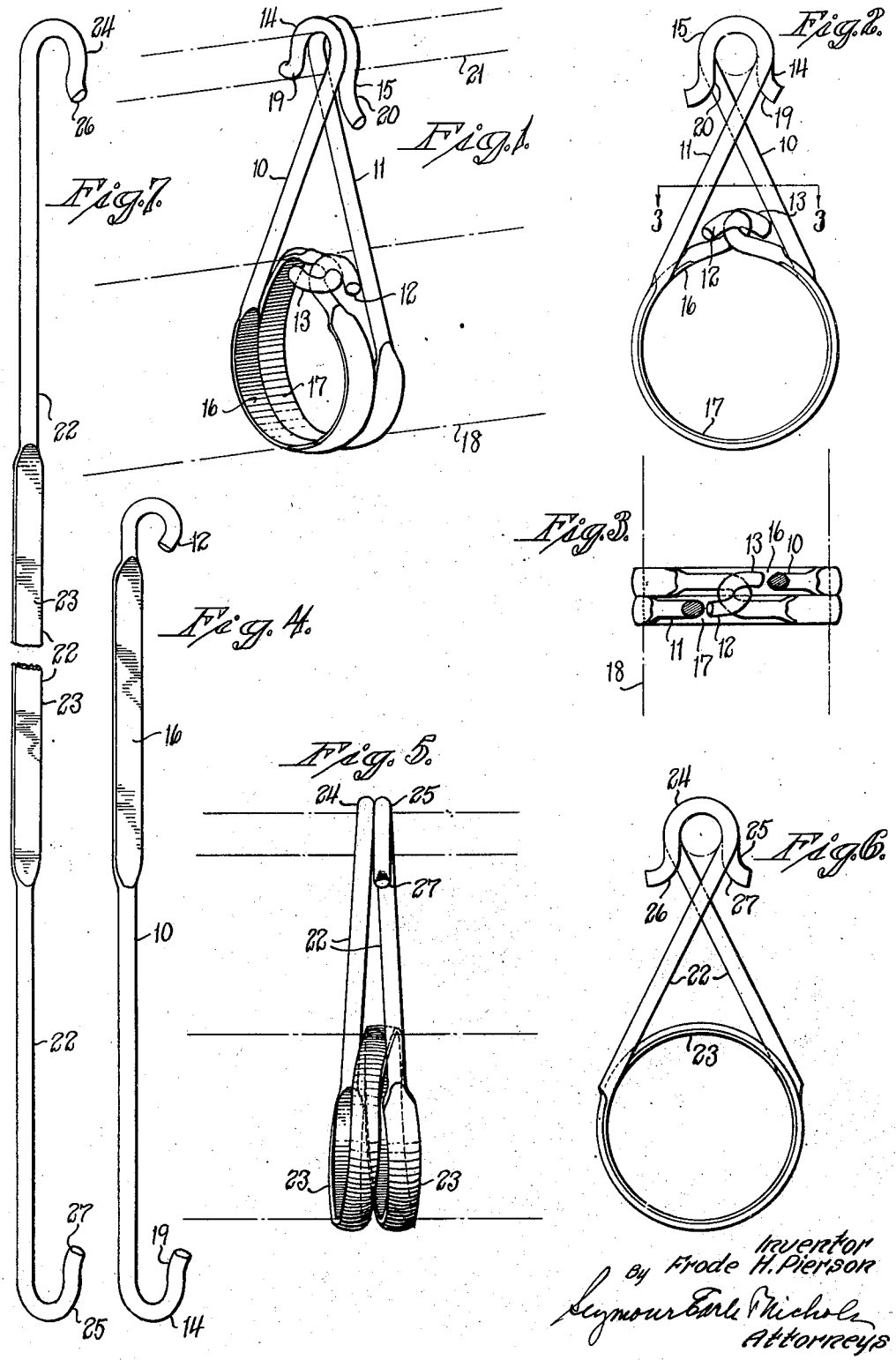

Patented Sept. 5, 1939

2,172,174

UNITED STATES PATENT OFFICE 2,172,174

CABLE HANGER

Frode H. Pierson, Hamden, Conn., assignor to The West Haven Buckle Company, West Haven, Conn., a corporation of Connecticut Application December 16, 1938, Serial No. 246,035

1 Claim. (Cl. 248—61)

This invention relates to an improvement in cable hangers particularly adapted for supporting or suspending electric cables from a "messenger" wire which is stretched from pole to pole and properly secured.

One object of my invention is to provide a hanger to be wrapped around the cable so as to provide two stretches of wire beneath the cable, so as to firmly grip the cable to prevent damage to the insulating covering thereon.

Another object of the invention is to form the hanger in two parts, with their ends coupled together, to accomplish the object first mentioned; and the invention consists in the construction as hereinafter described and particularly recited in the claim.

With the above and other objects in view, as will appear to those skilled in the art from the present disclosure, this invention includes all features in the said disclosure which are novel over the prior art.

In the drawing:

Fig. 1 is a perspective view of a cable hanger embodying my invention, showing the same applied to a cable and suspended from a messenger;

Fig. 2 is an end view of the same;

Fig. 3 is a sectional view on the line 3—3 of Fig. 2;

Fig. 4 is a perspective view of one of the parts detached;

Fig. 5 is a front view of a hanger formed from a single strip of metal;

Fig. 6 is an end view of the same; and

Fig. 7 is a perspective view of the same before application to a cable.

In the preferred form of my invention, I employ two strips of metal, preferably wires 10 and 11 and preferably round, and formed respectively with short interlocking hooks 12 and 13 at one end, and with suspension-hooks 14 and 15 at the opposite end. The ends 19—20 of the hooks are preferably turned inward as shown, to prevent the hooks from being accidentally disengaged from the messenger. The wires are flattened near the hooks 12 and 13 to form seats 16 and 17. To apply the hangers to a cable, the hooks 12 and 13 are interlocked and placed across the upper surface of a cable 18, and then the two members are turned downward and around the cable, forming a comparatively wide seat for a cable, and thence upward, to engage with a messenger 21. Flattening the wires as shown makes them so malleable that the bending operation is easy and does not require the use of any tool for that purpose.

In Figs. 5, 6 and 7 I have illustrated a modified form of my invention, showing the hanger 22 formed from a single piece of metal, the central portion 23 of which is flat and formed at opposite ends with suspension-hooks 24—25, the ends 26—27 of which are bent outward. This form of my invention is applied to the cable as in the construction first described, that is, the strip is laid across the cable, then the ends are bent downward around the cable and thence upward, and the suspension-hooks engaged with the messenger, as shown in Figs. 5 and 6.

It will thus be seen that in either construction I provide a hanger which firmly grips the cable and provides a wide seat for the cable.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

I claim:

A cable hanger comprising two members adapted to be interlocked and each formed with a flattened section, said flattened sections arranged side by side whereby a wide seat for a cable is provided, the two members each provided with a suspension-hook.

FRODE H. PIERSON.